March 27, 1962  W. H. WAKEFIELD  3,026,610
METHOD OF MAKING A FILTER CARTRIDGE
Filed Oct. 8, 1959

INVENTOR
WALTER H. WAKEFIELD

Charles T. Hawley
ATTORNEY

United States Patent Office
3,026,610
Patented Mar. 27, 1962

3,026,610
METHOD OF MAKING A FILTER CARTRIDGE
Walter H. Wakefield, Worcester, Mass., assignor to Carl N. Beetle Plastics Corporation, Fall River, Mass., a corporation of Massachusetts
Filed Oct. 8, 1959, Ser. No. 845,110
8 Claims. (Cl. 29—451)

This invention relates to improvements in methods for inserting filter material into a tube forming part of a filter cartridge.

Liquid fuel for certain types of aircraft must be filtered before being put into the tank of the aircraft. The present invention relates more particularly to filters of this type although it is not thus limited and an important object of the invention is to provide a method which will permit the insertion of compressed filter material into the outer tube of a cartridge and then permit it to expand to fill the space between the outer and an inner tube.

In carrying out the invention filter material such as Fiberglas is wrapped around an inner tube to a diameter greater than the inside diameter of the outer tube. The diameter of the filter material must be reduced before it can be inserted into the outer tube and this is accomplished as set forth herein by helically wrapping an elongated flexible member having a smooth, uninterrupted surface throughout, such as wire or cord, around the filter material tightly enough to reduce it to a compressed diameter somewhat less than the inside diameter of the outer tube. The inner tube and the filter material thus compressed are then inserted into the outer tube and the flexible member is uncoiled to permit the resilient material to expand and fill the space between the two tubes.

The invention can be accomplished by the use either of bare wire or a relatively small diameter cord or thread which is wrapped around the filter material in such manner that the free end thereof can be pulled to effect uncoiling and removal.

When the filter material is in the form of inherently resilient sheets of Fiberglas it is desirable that the uncoiling of the flexible member be in such a direction as will not unduly disturb the outer edge of the last wrap of the filter material around the inner tube. It will be desirable to have the uncoiling member pass over the edge of the sheet filter material in a direction from the last wrap to the wrap therebeneath. This can be done either by uncoiling from the end at which the coiling begins or from the opposite end. The coiling of the member will be in a direction which will be determined by the direction of wrapping of the filter material as will be set forth hereinafter.

Figure 1:
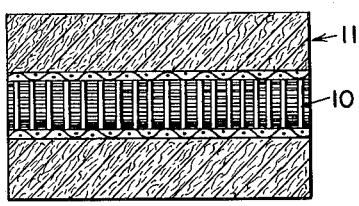
Figure 2:
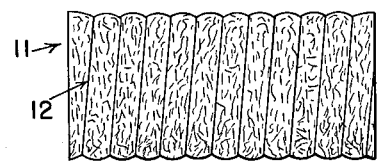
Figure 3:
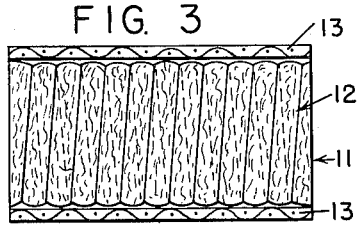

In order that the invention may be clearly understood reference is made to the accompanying drawings which illustrate by way of example the two embodiments of the invention and in which:

FIG. 1 is a longitudinal vertical section showing filter material wrapped around an inner tube, FIG. 2 shows the effect which wrapping a flexible member around the filter has in reducing its diameter, FIG. 3 is a vertical section through an outer tube showing the compressed filter material inserted thereinto.

Figure 4:
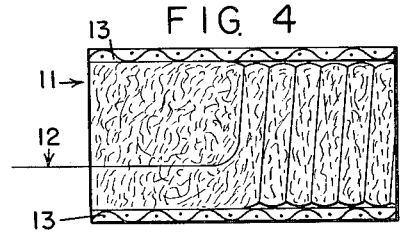
Figure 8:
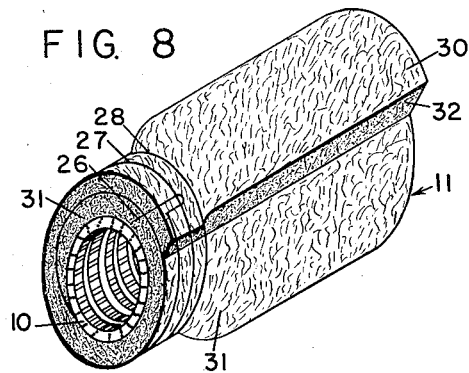
Figures 6, 7:
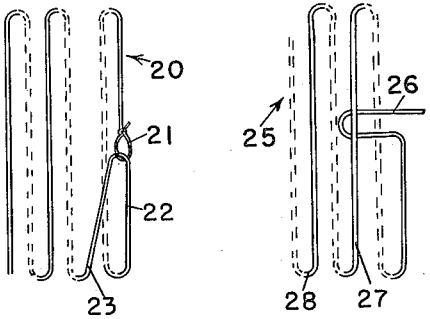
Figure 5:
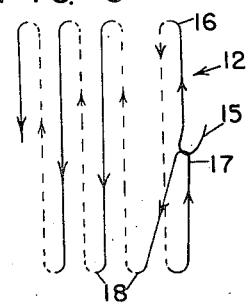

FIG. 4 is similar to FIG. 3 except that it shows the method by which the flexible member is uncoiled by having one of its ends pulled, FIG. 5 is a detailed view showing how the coiling of a wire is started, FIG. 6 shows a flexible textile thread or cord having a loop in one end thereof through which the other end is passed preparatory to the coiling operation, FIG. 7 shows another manner in which the free end of textile cord can be held down firmly against the filter material so that it will not slip, and FIG. 8 is a perspective view showing one arrangement for wrapping the filter material and the flexible member.

Referring to FIG. 1, the inner tube 10 is seamless and may be made in any approved manner and of any desired material and preferably is perforated to permit the passage of the liquid to be filtered. Assembled directly onto and around this tube is the filter material designated generally at 11, two layers being shown. The filter material is preferably though not necessarily in sheet form having a width equal to the length of tube 10 and has considerable inherent resilience so that after a compressing force is released it tends to expand to its normal previous size.

In FIG. 2 an elongated flexible member in the form of a smooth, bare wire 12 has been wrapped tightly around the filter material to compress it to a much reduced diameter while on tube 10 and FIG. 3 shows the tube 10 and the compressed filter material after it has been inserted into a larger tube 13 which may also be perforated and in other respects be similar to tube 10 except for its diameter.

After the parts are assembled as indicated in FIG. 3 an end of the flexible member 12 is pulled lengthwise of the tubes to uncoil and remove it from the filter material. In FIG. 4 where this operation is shown the wire has been uncoiled from the left-hand end and the filter material has expanded to fill the space between the two tubes. FIG. 4 shows the filter material at the right-hand end still under compression but as uncoiling continues this material will also expand and in the last step of the operation the end of the wire or flexible member will be drawn between the outer tube and the filter material at which time all of the filter material will have expanded sufficiently to fill the space between the tubes.

FIG. 5 shows a hitch which can be used for initiating the wrapping of the wire. In that figure the wire is shown as having its free end 15 bent upwardly and its first coil 16 leading in the direction indicated by the arrows, first up and over the top of the filter material, then down behind it, then up from under the filter material to a position close to the end 15 which is then bent down to serve as an anchor 17. The direction of winding the wire is then reversed and the next and succeeding coils 18 are coiled in the direction indicated by the arrows, coming forwardly and under the filter material from the anchor point 17 and then wrapped around the material until it is compressed to the condition shown in FIG. 2.

After all the material has been compressed and inserted into the outer tube the end 15 can be bent to release the bight between coil 16 and the first coil 18 and be pulled out either with the finger or with a small hook and then pulled endwise to the right in a direction to effect the uncoiling.

In FIG. 6 the flexible member is indicated at 20 and may be a textile cord or thread, preferably of small diameter, having a loop 21 tied at one end thereof. Preparatory to the coiling operation the other end of the cord is passed through the loop thus forming one turn or coil 22 which encircles an end of the filter material and the cord then drawn tight, after which reverse coils 23 can be wrapped in much the same manner as described in connection with FIG. 5. Preparatory to uncoiling the loop 21 can be cut and the adjacent end of the cord then pulled endwise as described in connection with FIG. 5.

In FIG. 7 the flexible member is also a textile cord indicated at 25 but it is not equipped with a loop or does it have a kink corresponding to the wire, but it does have its end 26 passed to the left and then back toward the right and then the cord is wrapped around the filter material and forces the two parts of the end 26 of the cord into frictional holding engagement with the filter material. One of two wraps 27 can be used to establish sufficient friction so that thereafter the cord can have additional coils 28 wound around the filter material in the same direction as coils 27. After the compressed filter material has been placed in the large tube 13, which is open at both ends, the end 26 can be pulled to effect uncoiling and removal.

The flexible member, whether cord or wire, can be uncoiled from either end of the filter material but it is desirable to coil the member in the correct direction for the end from which it will be uncoiled if the filter material is in sheet form.

In FIG. 8, the outermost or top wrap 30 of the filter material is shown as having come from the left side of the inner tube 10 up and then toward the right and lying close to the next wrap 31 immediately under it with its edge 32 facing toward the right. When uncoiling it is desirable that the flexible member pass in a direciton from the wrap 30 toward the wrap 31 so that it will slip over the edge 32 and not be forced into it. This can be accomplished by wrapping the wire or cord around the filter material in the same direction as the filter material is wrapped on the tube 10 if the end which is to be pulled to effect uncoiling is the end at which coiling begins. Thus, in FIG. 8 the pulling of the wire or cord would be from the forward end shown. If uncoiling is to be effected from the opposite end then the coiling will be in a direction the reverse of the direction in which the filter material is wrapped on the inner tube. In all forms of the invention, the flexible element, be it wire, thread or cord, is coiled around the filter material so that each coil or winding will have substantially the same diameter.

Small bare copper wire size #28 has been found satisfactory for performing the method set forth herein but the invention is not limited either to wire or wire of this size. The cord shown in FIGS. 6 and 7 is made of textile material and has a much higher coefficiency of friction with the filter material than wire and it is for this reason that the end of the cord can be caught under the first wrap or two and be held tightly in place as suggested in FIG. 7. The cord or thread which has been used is that commonly employed as harness cord in jacquards for looms. The invention is not, however, limited to this type of cord when the flexible member is other than wire.

After the filter material has been installed in the outer tube further steps are necessary to complete the filter cartridge, such as applying plugs to the ends of the tubes to prevent escape of liquid without being filtered. The complete filter cartridge may be similar to that shown in a patent application being filed on even date herewith by Richard C. Bryan assigned to the assignee of this present invention. No claim is made herein for the cartridge.

I claim:

1. The method of making a filter cartridge including the following steps: assembling inherently resilient sheet filter material to an initial diameter directly around a seamless porous tube of a length equal to the width of the material, coiling a flexible elongated member in helical form so that all of the coils therof are the same diameter around said filter material to exert a compressing force thereon to reduce it to a compressed diameter on the tube less than said initial diameter, inserting the tube and filter material thus compressed thereon into a second porous tube having an inside diameter intermediate said initial and said compressed diameters, and uncoiling and removing the member from the filter material to enable the latter to expand and fill the space between said tubes.

2. The method set forth in claim 1 wherein the member is a textile cord having its end looped lengthwise of the first tube over the filter material and the cord is then wrapped around the material so that at least one of its coils presses the looped end against the material and all the coils of the cord are of substantially the same diameter and extend around the material in the same direction.

3. The method set forth in claim 1 wherein the member is a wire of smooth, uninterrupted surface throughout and preparatory to coiling the wire the first wrap thereof is bent around a free end of the wire and the direction of wrapping the wire is then reversed so that said free end serves as an anchor to hold a reverse bend in the wire, said free end being slipped out of said reverse bend preparatory to uncoiling of the wire.

4. The method set forth in claim 2 wherein the member is a cord of smooth, uninterrupted surface having a loop in one end thereof and after the first wrap the other end of the cord is passed through the loop and the direction of the succeeding wraps is reversed to draw the first wrap tight, and the loop is cut preparatory to uncoiling and removing of the cord.

5. The method of making a filter cartridge including the following steps: wrapping inherently resilient filter material in sheet form in a given direction directly around a seamless porous tube to an initial diameter the length and width respectively of the tube and the material being equal, wrapping a coil of an elongated flexible member around said filter material and over the adjacent end of the member to force the latter against the material, coiling the member so that all the coils are of substantially the same diameter helically around the material on the tube in said direction to exert a compressing force on the filter material to reduce it to a compressed diameter on the tube less than said initial diameter, inserting the tube and the filter material thus compressed into a second porous tube having an inside diameter intermediate said initial and said compressed diameters, and pulling on said end of the member to uncoil and remove it from the filter material to enable the latter to expand and fill the space between the tubes, the member when uncoiling slipping over the outer edge of the filter material in a direction from the last outer wrap thereof toward the wrap thereunder.

6. The method of making a filter cartridge including the following steps: wrapping inherently resilient filter material in sheet form in a given direction directly on and around a seamless porous tube to an initial diameter the width of the material being the same as the length of the tube, wrapping a coil of an elongated flexible member around said filter material and over the adjacent end of the member to force the latter against the material, coiling the member so that all the coils are of substantially the same diameter helically around the material while on the tube in a direction opposite to said direction to exert a compressing force on the filter material to reduce it to a compressed diameter on the tube less than said initial diameter, inserting the tube and the filter material thus compressed into a second porous tube having an inside diameter intermediate said initial and said compressed diameters, and pulling on the opposite end of the member to uncoil and remove it from the filter material to enable the latter to expand and fill the space between the tubes, the member when uncoiling slipping over the outer edge of the filter material in a direction from the last outer wrap thereof toward the wrap thereunder.

7. The method of making a filter cartridge including the following steps: providing two seamless porous tubes of unequal diameter the larger of which has a given internal diameter, wrapping inherently resilient filter material directly on the smaller tube to a diameter in excess of said given diameter, helically coiling a textile thread so that all the coils are of substantially the same diameter around the filter material to exert a compressing force thereon which reduces it to a diameter on the smaller tube less than said given diameter, inserting the smaller tube and filter material thereon into the larger tube, and uncoiling the thread from the filter material to enable the latter to expand and fill the space between the tubes.

8. The method of inserting a body of inherently resilient filter material on a first tube which is porous and having a given uncompressed normal diameter into a second tube which is also porous having an internal diameter less than said given diameter consisting in coiling an elongated flexible member helically around the material to reduce its diameter on said first tube to a size which will enable it together with said first tube to be inserted into the second tube, inserting the first tube and the material thereon into the second tube, and uncoiling the member after the material has been thus inserted into the second tube to enable the material to expand against the inner surface of the second tube and the outer surface of said first tube.

References Cited in the file of this patent

UNITED STATES PATENTS

| | | |
|---|---|---|
| 1,497,185 | Mitchell | June 10, 1924 |
| 2,341,097 | Heebink | Feb. 8, 1944 |
| 2,550,070 | Brecque et al. | Apr. 24, 1951 |
| 2,746,138 | Smith | May 22, 1956 |